Sept. 5, 1961 E. H. SCHULTZ 2,998,961
AUTOMOBILE BUMPER JACK SADDLES
Filed May 2, 1958 3 Sheets-Sheet 1
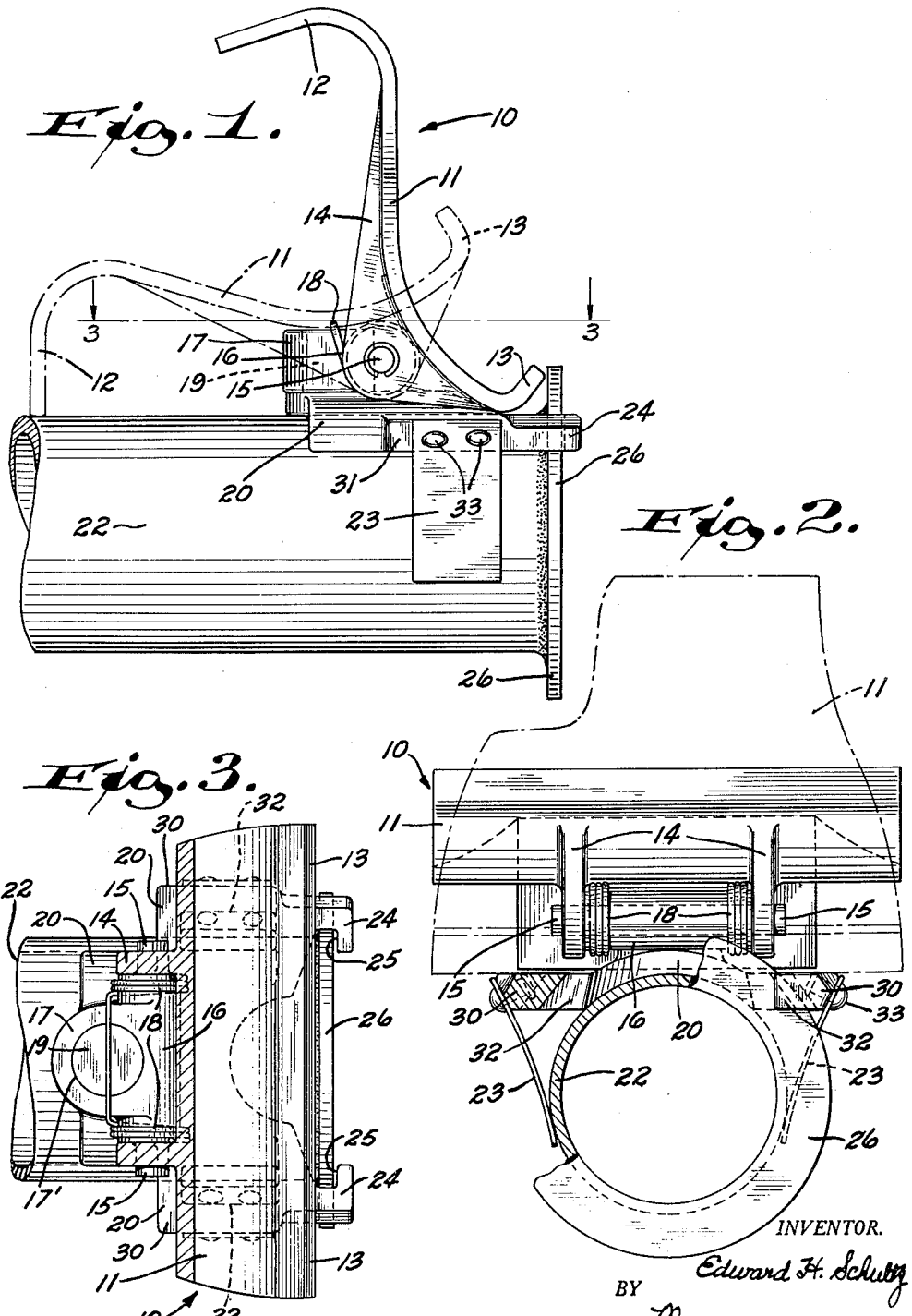

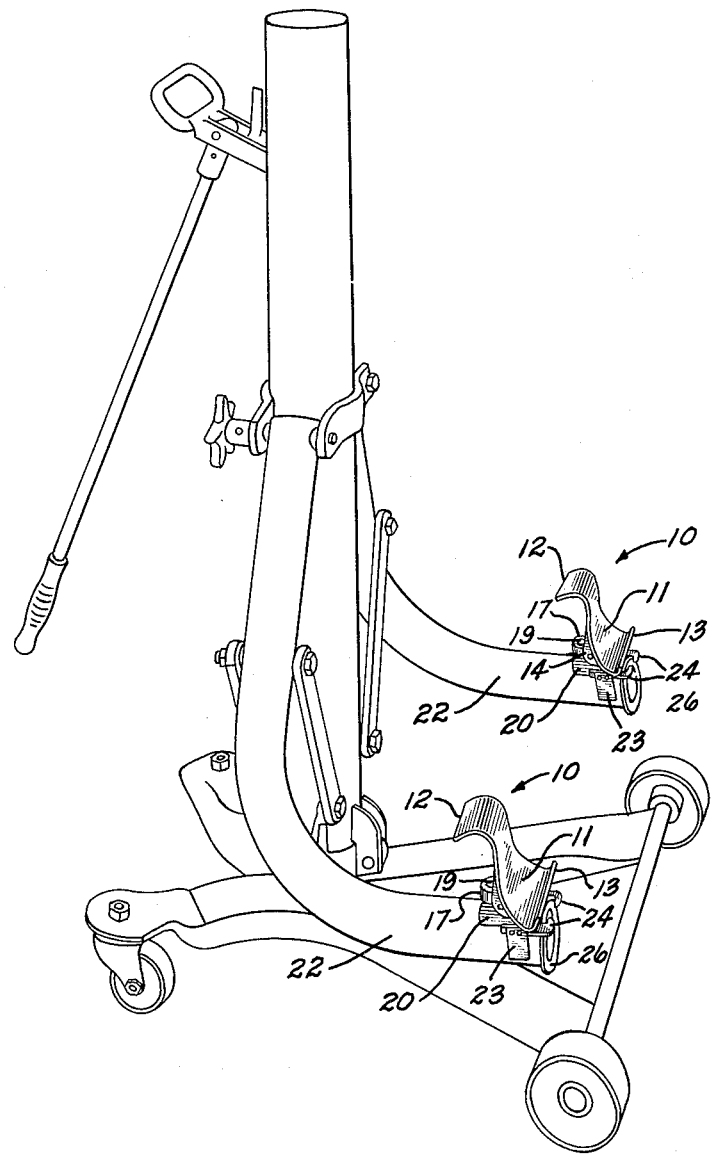

Sept. 5, 1961     E. H. SCHULTZ     2,998,961
AUTOMOBILE BUMPER JACK SADDLES
Filed May 2, 1958     3 Sheets-Sheet 3
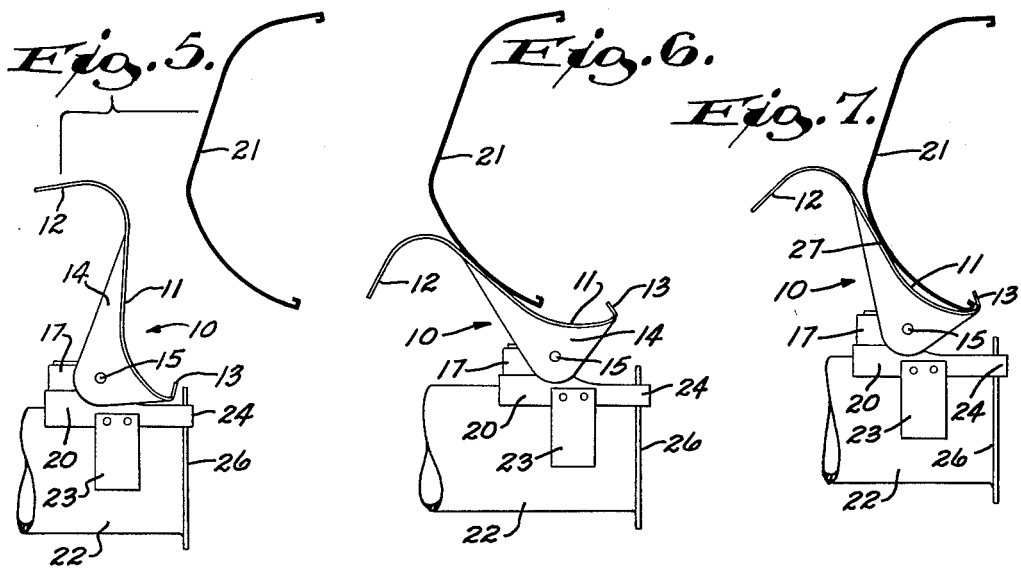
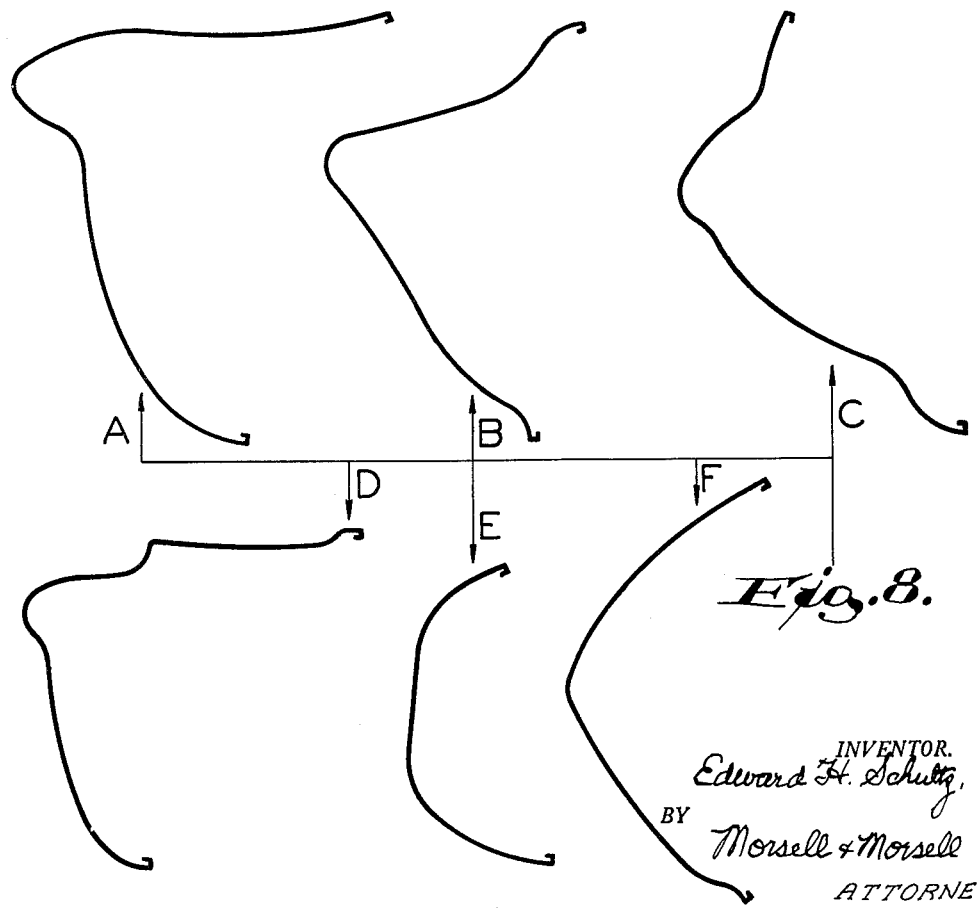
INVENTOR.
Edward H. Schultz,
BY Morsell & Morsell
ATTORNEYS.

2,998,961
AUTOMOBILE BUMPER JACK SADDLES
Edward H. Schultz, 13801 W. Cardinal Parkway, Milwaukee, Wis.
Filed May 2, 1958, Ser. No. 732,574
13 Claims. (Cl. 254—133)

This invention relates to improvements in automobile bumper jack saddles, and more particularly to a saddle which is usable with any of the variety of bumper shapes employed in modern automobiles.

The bumpers used in most of the newer automobiles have complex cross-sectional shapes which present certain problems when it is desired to lift the automobiles for the purpose of repair or inspection. It has been found that conventional service jacks cannot be securely attached to many of such bumpers, with the result that the lifting operation is difficult and hazardous. In addition, because of their intricate designs, such new style bumpers are formed of relatively soft metal and are easily dented or deformed when engaged by a jack, particularly if the forces resulting from such engagement are not properly distributed. It is a general object of the present invention, therefore, to provide an improved bumper jack saddle which will not deform or otherwise injure the bumpers of modern automobiles, and which will permit the safe raising or lowering of such automobiles, the saddle being particularly adapted for use on service jacks of the type having spaced horizontal lifting arms.

A more particular object of the present invention is to provide in an automobile bumper jack a saddle which has spaced contact points, thereby dividing the lifting pressure and reducing the possibility of denting.

A further object of the invention is to provide a bumper jack saddle which has a universal pivot, thereby permitting the saddle to adapt itself to the angle and cross-sectional shape of the particular bumper being engaged.

A further object is to provide a bumper jack saddle which may be easily swung to an out-of-the-way position on the lifting arm when the saddle is not in use.

A still further object of the invention is to provide a readily detachable bumper jack saddle having novel spring actuated clamping means permitting easy assembly on and removal from a jack arm without use of bolts.

Other objects of the present invention are to provide an automobile bumper jack saddle which is inexpensive to construct, durable in use, and simple and positive in its operation.

With the above and other objects in view, the invention consists of the improved bumper jack saddle, and all of its parts and combinations, as set forth in the claims, and all equivalents thereof.

In the accompanying drawings, wherein the same reference numerals designate the same parts in all of the views:

FIG. 1 is a side elevational view of the improved saddle in position on a jack arm, and showing, in broken lines, the saddle tilted rearwardly to an inoperative position;

FIG. 2 is a front end view of a jack lifting arm, with a part being broken away and shown in section, with the saddle in a tilted position thereon, and showing, in broken lines, the saddle in its upright or operative position;

FIG. 3 is a top view showing the saddle in operative position, taken on line 3—3 of FIG. 1;

FIG. 4 is a perspective view of a hydraulic service jack with the improved bumper saddles mounted thereon;

FIG. 5 is a partially diagrammatic side view of the bumper jack arm and saddle showing the relationship at the start of a jacking operation;

FIG. 6 is a diagrammatic view of the saddle and bumper showing the relative positions when the bumper is initially engaged by the saddle;

FIG. 7 is a diagrammatic view showing a bumper engaged by the saddle and in final position for lifting; and FIG. 8 is a series of bumpers, illustrating the variety of cross-sectional bumper shapes used in modern automobiles.

Referring more particularly to the drawings, the bumper saddle 10 comprises a bumper-engaging saddle plate 11 formed of steel or other durable material, which plate is somewhat tapered in plan view, the lower portion being relatively wide and becoming progressively narrower toward its top. Said saddle plate 11 has its upper end portion 12 reversely turned or bent generally right-angularly in a downward direction to project away from the bumper with its lower edge serving as a stop for rearward tilting, and said plate has its lower portion bent to form an upturned lip 13. There is a rounding at 12 for sliding engagement with the bumper, as shown in FIG. 6, while the jack is being raised. The intermediate portion of the saddle plate is curved to be generally concave in side view, as shown in FIG. 1, to conform to the general cross-sectional contour of most bumpers.

The back or underside of the saddle plate 11 is provided with a pair of spaced, apertured ears 14 which receive a horizontal pin 15, said pin extending transversely to the longitudinal axis of the lifting arm 22 upon which the saddle is mounted. The pin 15 is journaled in a cylindrical bearing 16 which extends between said ears 14, the bearing extending transversely across the front of and being integral with a pivot block 17 having a bore 17′ at right angles to the bearing 16. As will best be seen in FIGS. 2 and 3, a torsion spring 18 is wound about the ends of the bearing 16, the free ends of which spring abut the back of said saddle and tend to urge the same to its normal, generally upright position.

As illustrated in FIGS. 1 and 3, the bore 17′ of the block 17 rotatably receives a stud 19 which projects upwardly from a base member 20. It will be readily appreciated that this universal connection permits free horizontal rotation of the saddle about the stud, as well as rotation of the saddle on the horizontal pin 15.

The swivel on the vertical axis enables said saddle to automatically adapt itself to the angle of the engaged bumper portion, which may be as much as 10 degrees, and the pivot on the horizontal axis allows the saddle to automatically adapt itself to a wide variety of cross-sectional bumper shapes.

The base 20 is generally convex as shown in FIG. 2 to fit the curvature of a jack arm 22. The forward portion of said base, however, has laterally projecting wings 30 which have front fingers 24 provided with notches 25. These notches receive the flange 26 at the front end of a jack arm 22 to prevent the saddle from slipping rearwardly on the arm. Riveted or otherwise secured to the side edges 31 of the wings 30 are spring clamps 23 (see FIG. 1). These side edges are angled to support the clamps 23 in downwardly converging relationship as shown in FIG. 2. In order to facilitate the riveting the wings 30 may be formed with interior openings 32. With this arrangement the rivets 33 may have their inner ends headed against the internal margins of the openings as shown in FIG. 3. With this construction the yielding spring clamps 23 form releasable means for readily removably holding the saddle on its arm as shown in FIGS. 1 and 2. To remove a saddle it is merely necessary to pull upwardly, the spring clamps 23 giving during such movement. This mounting arrangement, together with the engagement of the saddle arm flange 26 in the notches 25, permits swiveling of the saddle to a depending inoperative position when it is not desired to use the saddle.

It will be noted in FIG. 7 that the present bumper saddle is designed to contact and support a bumper 21 at two spaced points. The lower edge of the bumper is engaged and retained by the upturned saddle lip 13, as will be more fully described hereinafter, and an upper portion of the saddle plate 11 contacts an upwardly and rearwardly inclined portion of the bumper at a point such as the point 27 of FIG. 7.

Heretofore, conventional bumper jack arms have engaged the bumpers being lifted at a single point, usually on the lower edge of the bumper, with the result that said lower edge is quite often dented or deformed by the pressure concentrated on a single point. In the present invention, however, the saddle always contacts two spaced points to divide the lifting forces, and the lip 13 serves to prevent improper contact with the lower edge of a bumper. Thus, the likelihood of deformation is substantially reduced. The latter feature is of particular importance in new cars, where the complexity of the bumper shapes has necessitated the use of relatively soft metal, and where the denting and deformation of the bumpers has become a problem.

By way of example of the variety of cross-sectional bumper shapes employed in modern automobiles, FIG. 8 illustrates the front bumper designs of the following 1957 automobiles: A—Buick; B—Pontiac; C—Mercury; D—Oldsmobile; E—Lincoln; and F—Rambler. As will be readily appreciated, such a diversity of shapes ordinarily presents definite problems when it is desired to engage a jack with a bumper. The universal mounting of the saddle together with the novel structure comprising the present invention, permits the saddles to automatically receive any of said bumpers and to engage and support the same without denting or otherwise deforming the lower edges thereof.

In addition to providing an effective means for lifting an automobile without damaging the bumper as aforesaid, the improved bumper saddle is also adapted to secure the jack to a bumper in a manner whereby the possibility of an automobile slipping off the jack is eliminated. When the saddle is tilted rearwardly, as when a bumper has been engaged and is ready to be lifted, as illustrated in FIG. 7, the upturned lip 13 formed on the bottom of the saddle plate effectively prevents accidental disengagement.

The second point of contact (27 of FIG. 7) between the bumper and saddle plate 11, the exact location of which is dependent upon the shape of the bumper being lifted, coacts with said retaining lip 13 in providing additional insurance against the accidental disengagement of the bumper. As shown in FIG. 7, the upper contact point 27 functions as a fulcrum whereby the weight of the automobile urges the coacting parts into a final position of firm engagement with the upturned retaining lip 13. The effect of this construction is such that the heavier the vehicle the more firmly and securely its bumper is held by the retaining lip.

In practice, the saddle assembly 10 may be installed on a jack both quickly and easily. The saddle is positioned over the lifting arm of a jack and the flat spring clamps 23 spread and pressed downwardly until they pass below the transverse centerline of the jack arm. The notches 25 are simultaneously held in a position to receive and engage the annular flange 26 at the front of the lifting arm, and the bumper jack is then ready for use.

In applying the saddles to an automobile bumper, the jack of FIG. 4 is pushed up nearly into engagement with the bumper and the lifting arms are raised to within about two inches from the bottom of the bumper, as illustrated in FIG. 5. The jack is then urged forwardly to permit the bumper to slidably engage the rounding 12 of the saddle plate and to tilt the same backward to about a 45 degree angle, as in FIG. 6. The lifting arm 22 is next jacked up until the saddle lightly engages the bottom of the bumper, as shown in FIG. 6. Finally, the jack is pulled toward the operator until the upturned lip 13 engages the lower edge of the bumper, as illustrated in FIG. 7. The saddle is then in position to lift the car safely.

Various changes and modifications may be made without departing from the spirit of the invention, as above described, and all of such changes are contemplated as may come within the scope of the claims.

What I claim is:

1. A bumper saddle for use on an automobile service jack of the type having an elongated forwardly projecting horizontal lifting arm comprising a base adapted to be positioned in a predetermined position on top of said service jack lifting arm, means depending from said base detachably engageable with said lifting arm to maintain the base in said predetermined position, a saddle plate having a lower portion shaped to engage beneath the lower edge of a bumper, said plate being shaped so that another portion is adapted to engage a bumper at a location spaced above the lower edge, and means pivotally mounting said plate above said base for pivotal movement from a generally upright position to a rearwardly pivoted substantially horizontal position on said base.

2. A bumper saddle for use on an automobile service jack of the type having a horizontal lifting arm with a top horizontally extending surface comprising a base adapted to be positioned on top of said horizontally extending surface of said service jack lifting arm, a saddle plate mounted on said base and having a lower portion shaped to engage beneath the lower edge of a bumper, said plate being shaped so that another portion is adapted to engage a bumper at a location spaced above the lower edge, and means for mounting said plate on said base so that said plate extends transversely of the lifting arm, said mounting means including a universal connection whereby the saddle plate may adapt itself to the shape of a particular bumper.

3. In an automobile bumper jack having a horizontal lifting arm, a bumper saddle comprising: a saddle plate, said plate having a concave bumper-receiving face, the lower end thereof having a lip shaped to engage and retain the lower edge of a bumper, and said plate being formed to engage a bumper at a second point between its top and bottom edges, a base; a universal connection between said saddle plate and base, connecting means on said base horizontally slidably connecting the latter on top of said lifting arm of the jack, and cooperating means on said lift arm and base preventing endwise outward sliding movement of the saddle on said arm.

4. In an automobile service jack having a horizontal lifting arm, said lifting arm having an annular flange formed on the end thereof, a bumper saddle comprising: a bumper-receiving saddle plate; a base; means for mounting said saddle plate on said base; a pair of spaced spring members extending downwardly from said base and detachably engaging the sides of the jack lifting arm and removably retaining said saddle thereon; and a pair of spaced fingers projecting forwardly from said base, said fingers having notches therein positioned to receive and engage said lifting arm flange to prevent sliding movement of the saddle on said arm.

5. In an automobile bumper jack having a lifting arm, said lifting arm having an annular flange formed on the end thereof, a bumper saddle comprising: a bumper-receiving saddle plate, said saddle plate being shaped to engage a bumper at a point between the top and bottom edges thereof, and said saddle plate having its lower end bent upwardly to form a lip for engaging within and beneath the lower edge of a bumper; a base; means for mounting said saddle plate on said base to provide for universal pivotal movement of said saddle plate; a pair of spaced spring clamps extending downwardly from said base and engaging the sides of the lifting arm to detachably retain said saddle thereon in a manner whereby said saddle may be rotated on said lifting arm to a depending position when the saddle is not in use; and a pair of laterally spaced fingers projecting forwardly from said base, said fingers having notches therein positioned to receive and engage said lifting arm flange to prevent longitudinal movement of the saddle on said arm while permitting said rotating movement of the saddle on the arm.

6. In an automobile service jack provided with a horizontal lifting arm having a projecting end with a top horizontal surface adapted to be horizontally moved in a predetermined direction into position beneath a vehicle bumper, a base plate removably attached on top of said top horizontal surface, a saddle plate transversely pivoted on said base plate to be also above said top horizontal surface and having a forwardly facing concavity and having a lower upturned lip, said saddle plate having its upper portion reversely turned to project away from the bumper when the device is being used and provide a rounding for sliding engagement with the bumper when the jack is being raised and until the lower lip is brought into engagement with the lower edge of the bumper, the base plate being so located on the lifting arm that the saddle plate rocks on its pivotal connection in response to bumper contact from a generally upright position on and above the top horizontal surface of the arm to a rearwardly pivoted position above said arm.

7. In an automobile service jack provided with a horizontal lifting arm having a projecting end with a top horizontal surface adapted to be horizontally moved in a predetermined direction into position beneath a vehicle bumper, a base plate having spaced spring clamps removably connecting it on top of said top horizontal surface, a saddle plate transversely pivoted on said base plate to be also above said top horizontal surface and having a forwardly facing concavity and having a lower upturned lip, said saddle plate having its upper portion reversely turned to project away from the bumper when the device is being used and provide a rounding for sliding engagement with the bumper when the jack is being raised and until the lower lip is brought into engagement with the lower edge of the bumper, the pivot for said saddle plate being so located on the lifting arm that the plate rocks on its pivotal connection in response to bumper contact from a generally upright position on and above the top horizontal surface of the arm to a rearwardly pivoted position above said arm.

8. In an automobile service jack provided with a horizontal lifting arm having a projecting end with a top horizontal surface adapted to be horizontally moved in a predetermined direction into position beneath a vehicle bumper, a saddle plate transversely pivoted on said top horizontal surface to be located thereabove and having a forwardly facing concavity and having a lower upturned lip, said saddle plate having its upper portion reversely turned on a relatively large radius to project away from the bumper when the device is being used and provide a stop, and also to provide a rounding for sliding engagement with the bumper when the jack is being raised and until the lower lip is brought into engagement with the lower edge of the bumper, the pivot for said saddle plate being so located on the lifting arm that the plate rocks on its pivotal connection in response to bumper contact from a generally upright position on and above the top horizontal surface of the arm to a rearwardly pivoted position above said arm which is limited by engagement of said stop portion of the saddle with the lifting arm.

9. In an automobile service jack provided with a horizontal lifting arm having a projecting end with a top horizontal surface adapted to be horizontally moved in a predetermined direction into position beneath a vehicle bumper, a saddle plate transversely pivoted on said top horizontal surface to be located thereabove and having a forwardly facing concavity and having a lower upturned lip, said saddle plate having its upper portion reversely turned to project away from the bumper when the device is being used and provide a rounding for sliding engagement with the bumper when the jack is being raised and until the lower lip is brought into engagement with the lower edge of the bumper, the pivot for said saddle plate being so located on the lifting arm that the plate rocks on its pivotal connection in response to bumper contact from a generally upright position on and above the top horizontal surface of the arm to a rearwardly pivoted position above said arm.

10. In an automobile service jack provided with a horizontal lifting arm having a projecting end with a top horizontal surface adapted to be horizontally moved in a predetermined direction into position beneath a vehicle bumper, a saddle plate universally pivoted on said top horizontal surface to be located thereabove and having a forwardly facing concavity and having a lower upturned lip, said saddle plate having its upper portion reversely turned to project way from the bumper when the device is being used and provide a rounding for sliding engagement with the bumper when the jack is being raised and until the lower lip is brought into engagement with the lower edge of the bumper, the pivot for said saddle plate being so located on the lifting arm that the plate rocks on its pivotal connection in response to bumper contact from a generally upright position on and above the top horizontal surface of the arm to a rearwardly pivoted position above said arm.

11. In an automobile service jack provided with a horizontal lifting arm having a projecting end with a top horizontal surface adapted to be horizontally moved in a predetermined direction into position beneath a vehicle bumper, a base plate having spring clamps removably connecting it on top of said horizontal surface, cooperating means on said base plate and lifting arm for preventing sliding movement of this base plate thereon, a saddle plate transversely pivoted on said base plate and having a forwardly facing concavity and having a lower upturned lip, said saddle plate having its upper portion reversely turned to project away from the bumper when the device in being used and provide a rounding for sliding engagement with the bumper when the jack is being raised and until the lower lip is brought into engagement with the lower edge of the bumper, the pivot for said saddle plate being so located on the lifting arm that the plate rocks on its pivotal connection in response to bumper contact from a generally upright position on and above the top horizontal surface of the arm to a rearwardly pivoted position above said arm.

12. In an automobile service jack having a horizontal lifting arm, stop means near an end of said arm, a bumper receiving saddle plate, a base, means mounting said saddle plate on said base, a pair of spaced spring members extending downwardly from said base and detachably engaging opposite sides of the jack lifting arm to removably retain the base and saddle thereon, and means on said base engaging the stop means on said lifting arm to prevent sliding movement of the base and saddle on said arm.

13. In an automobile service jack having an elongated, forwardly-projecting lifting arm with an uppermost horizontally extending portion, a bumper saddle comprising: a bumper-engaging saddle plate having a lower portion shaped to engage beneath the lower edge of an automobile bumper, said plate being shaped so that another portion thereof is engageable with the bumper at a location spaced above said bumper lower edge; and means for universally pivotally mounting said saddle plate on top of said lifting arm uppermost horizontal portion, said mounting means permitting said saddle plate to pivot in a horizontal plane to adapt itself to the longitudinal shape of the engaged portion of the bumper, and said universally pivotal mounting means permitting said saddle plate to pivot in a vertical plane from a substantially upright position above said lifting arm horizontally extending portion to a substantially horizontal position thereabove in response to engagement of said saddle plate with the automobile bumper.

References Cited in the file of this patent
UNITED STATES PATENTS

| | | |
|---|---|---|
| 2,740,607 | Branick | Apr. 3, 1956 |
| 2,743,903 | Lucker | May 1, 1956 |